Jan. 26, 1965  J. R. HILL ETAL  3,167,176
METHOD OF AND APPARATUS FOR CORRECTING TUBE ECCENTRICITY
Filed Dec. 4, 1961
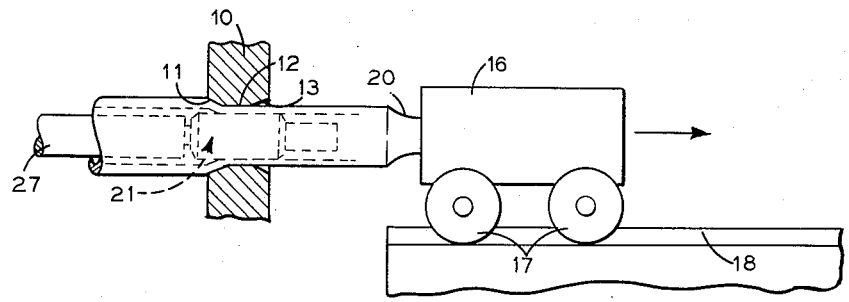
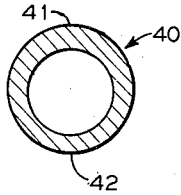
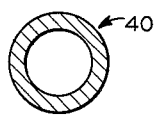
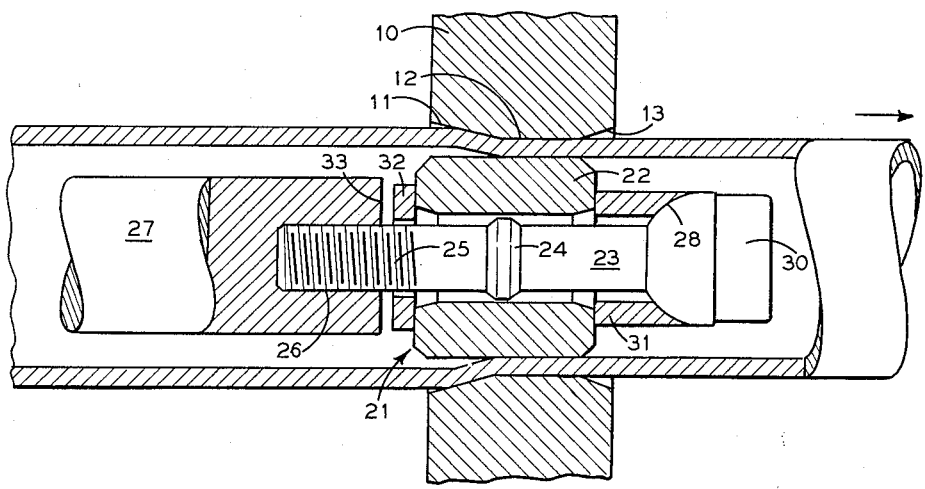
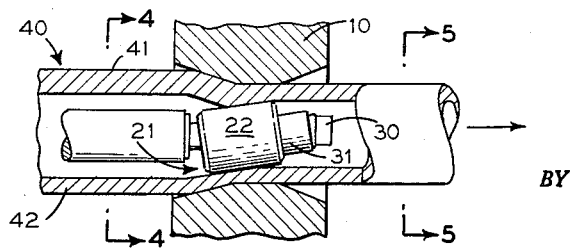
INVENTORS
John R. Hill
Joseph A. Sawester
BY
ATTORNEY

United States Patent Office 3,167,176
Patented Jan. 26, 1965

3,167,176
METHOD OF AND APPARATUS FOR CORRECTING TUBE ECCENTRICITY
John R. Hill and Joseph A. Sawester, Beaver Falls, Pa., assignors to The Babcock & Wilcox Company, New York, N.Y., a corporation of New Jersey
Filed Dec. 4, 1961, Ser. No. 156,801
6 Claims. (Cl. 205—7)

The present invention relates to the manufacture of metal tubing, and more particularly to a novel method of and apparatus for correcting eccentricity of the outer and inner surfaces or diameters of metal tubing so as to produce tubing of substantially uniform wall thickness.

In the manufacture of metal tubing, particularly seamless tubing, manufactured by the rotary piercing or extrusion processes, for example, there is usually a lack of concentricity between the inner and outer circular peripheries of the tubing resulting in a variation in the wall thickness of the tubing circumferentially thereof. The zones of maximum and minimum wall thickness are substantially diametrically opposite each other. In the case of extruded tubing, the zone of maximum wall thickness generally extends substantially longitudinally of the tubing whereas, in the case of rotary pierced tubing, such zone may follow a spiral path along the tubing.

For many applications of tubing, such variation in wall thickness is not an important factor. However, certain applications require tubing having not less than a specified or pre-set minimum wall thickness. When the inner and outer peripheries are not concentric, resulting in wall thickness varying from a maximum to a minimum, the actual minimum wall thickness must equal the required minimum thickness. In turn, the maximum wall thickness will then be in excess of the required minimum wall thickness. Consequently, the weight of metal in the tube will be in excess of that required were the wall thickness substantially uniform circumferentially of the tube.

Stated succinctly, to obtain a pre-set minimum wall thickness in a tube whose wall thickness varies circumferentially requires a greater amount of metal than is needed to obtain the same pre-set minimum wall thickness in a tube whose wall thickness is uniform circumferentially. As a result, the material cost of such a tube having a variable wall thickness exceeds that of a tube having a uniform wall thickness. This is an excess metal cost which can run into a large sum in mass production of tubing. Consequently, there is a substantial saving in metal cost available in producing tubes with a pre-set minimum wall thickness if the tubes can be produced with a uniform wall thickness, as less weight of metal would be required for each such tube.

In accordance with the present invention, it has been found that eccentricity between the inner and outer circumferential peripheries of a tube can be corrected by cold drawing the tube through a fixed position tube drawing die or rolls and over a swivel mandrel.

Drawing a tube through a fixed die and mandrel combination will reduce the outer diameter of the tube with or without any appreciable change in the wall thickness, so that the metal flow will be substantially all longitudinal during the sinking or drawing operation and any eccentricity present in the tube will remain substantially unchanged. Using the usual fixed position mandrel in combination with the fixed die may change both the internal and external diameters, and the wall thickness, depending on the die and mandrel dimensions, but will not appreciably change tube eccentricity. However, if the mandrel is of the universally pivotal, swivel type, the mandrel will correct tube eccentricity by reason of the self centering balance of forces imposed thereon.

One form of apparatus for performing this operation comprises an annular, size reducing die having a frusto-conical entrance throat fixed in position with its throat axis parallel to the longitudinal axis of the entering tube, and a swivel mandrel cooperating with the die. The self adjusting swivel mandrel will center itself relative to the line of movement of the tube through the die, with the amount of outward increase in radial unit pressure on the metal within the die varying, thus varying the amount of metal displacement circumferentially and longitudinally of the tube to substantially correct the tube eccentricity.

The line of heaviest wall or of thinnest wall may shift circumferentially along the length of the tube, and in many cases spirals along such length. Accordingly, when a fixed die is used with a swivel mandrel to perform the invention method, the swivel mandrel is self-adjusting so that the arc of application of increased outward radial unit pressure will be kept centered to act on the thickest arc of the tube wall.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Of the drawings:

FIG. 1 is a somewhat diagrammatic representation, partly in section, of a tube drawing apparatus including the structure of the present invention;

FIG. 2 is an enlarged longitudinal section of a reducing die and a swivel mandrel during the cold drawing of a tube;

FIG. 3 is a longitudinal section of a tube drawing apparatus, showing the arrangement of the invention swivel mandrel in an exaggeration correction of tube eccentricity;

FIGS. 4 and 5 are tube sections taken on the lines 4—4 and 5—5, respectively, of FIG. 3; and FIG. 6 is a force diagram of the die and mandrel shown in FIG. 3.

In the cold drawing of metallic tubes the drawbench may include an annular reducing die, a mandrel and a mechanism for drawing the tube through the die and over the mandrel. The die may be of the fixed or adjustable type, or may be formed of roller members while the mandrel may be of the fixed type or may be of the swivel type as hereinafter disclosed.

In the embodiment of the invention shown in the drawings an annular die 10 is mounted in a fixed position, with a converging entrance portion 11 merging into a cyclindrical portion 12 and a diverging discharge portion 13 defining a tube reducing throat. The axis of the throat is fixed in position to be parallel, and preferably coaxial, with the longitudinal axis of the tube drawn through the die 10.

As shown in FIG. 1, the mechanism for drawing the tube through the die 10 includes a carriage 16 mounted on wheels 17 engaging rails 18 for movement of the carriage and the tube thereon toward and away from the die 10 and in alignment with the axis of the throat. The carriage 16 is provided with jaws (not shown) actuated by pneumatic power pistons, for example, to grip the reduced end portion 20 of a tube to be drawn through the die 10. In the usual installation a mechanism is provided for moving the carriage 16 along the rails 18 at a controlled rate of movement so that the speed of tube movement through the die can be regulated as required by the nature of the tube reduction. Such mechanism may take the form of an endless chain (not shown) operated between the rails 18, and engaged or disengaged, as required, by a power actuated hook (not shown) on the carriage.

When a tube is drawn through an upright annular reducing die the external and internal diameters thereof are reduced without any appreciable change in the wall thickness of the tube. Under these circumstances the tube reduction, without the use of a mandrel, is commonly known as a "sinking" operation. With this reducing procedure the metal displaced in the tube reduction flows longitudinally to elongate the tube. The use of a rigid mandrel in cooperation with an upright annular die in reducing a tube also causes elongation of the tube by longitudinal displacement of metal with a reduction in the outside and inside diameters with or without a change in tube wall thickness, as desired.

As disclosed in a copending application S.N. 771,642, now Patent No. 3,095,083, owned by the assignee of this application, eccentricity in a tube may be corrected by tilting the die 10 so as to displace metal in a circumferential direction to increase the thickness of the thinner portion of the eccentric tube. In such a procedure the maximum thickness of the tube is not appreciably changed while the minimum thickness of the tube wall is increased during the sinking operation, with the amount of change largely dependent upon the tilt angle of the die.

In FIG. 2, the swivel mandrel 21 is shown as a hollow cylindrical barrel portion or body 22 enclosing a bolt 23 which is provided with a circumferential flange or ridge 24 positioned so as to be located substantially at the midpoint of the cylindrical body 22. The bolt 23 is provided with an inner threaded end 25 for engagement with a correspondingly threaded recess 26 in the end of a mandrel support bar 27. An upset cap having a curved inner surface 28 is formed on the outer end of the bolt 23 where the outermost portion of the cap is formed with flat sides 30 for engagement by a wrench, or the like, so that turning the bolt will engage or disengage the threads 26 and 25. A spacer or sleeve 31 is located between the body 22 and the surface 28 with the outer end of the sleeve formed to match the curvature of the surface 28. A washer 32 is inserted between the end 33 of the bar 27 and the body 22 so as to serve as a spacer therebetween.

With the construction described the mandrel body 22 is capable of swiveling about the ridge 24 as a pivot ring and centered on the axis of the bolt, as caused by the balance of forces acting thereon. Such movement of the mandrel body 22 is guided and restrained by the cooperation between the surface 28 and the sleeve 31, and limited by the washer 32. In the embodiment shown, the mandrel body 22 has an outer diameter of 2¼ inches, an inner diameter of 1 inch and a length of 2 inches. The flange or ridge 24 is 15/16 inch in diameter, so that the circumferential clearance between the internal diameter of the body 22 and the outer diameter of the ridge 24 is 1/32".

As hereinafter discussed, the swivel mandrel 21 pivots about the ridge 24 in accordance with the balance of pressures exerted thereon, and as the degree of pivotal movement of the barrel 22 increases the sleeve 31 will move on the curved surface 28 and on the abutting end surface of the body 22 for a greater eccentricity corrective action on the tube. This is shown in exaggerated form in FIG. 3, where an eccentric tube 40 is passed through a fixed upright die 10 and over the swivel mandrel 21.

The tube 40 is shown as having a thicker wall 41, at the top of FIG. 3, than the lower wall 42. While both the inner and outer surfaces of the tubes 40 are substantially cylindrical the center of curvature of the inner surface is spaced downwardly from the center of curvature of the outer tube surface. As the tube 40 is drawn through the die 10 the outer diameter of the tube is reduced without a substantial change in the thickness of the tube walls until the inner surface of the tube contacts the surface of the mandrel 21. Since the thicker wall portion of the tube will contact the surface of the swivel mandrel before the inner surface of the thin wall portion of the tube, the body 22 of the mandrel will be tilted downwardly, as shown. The effect of mandrel tilting, or swiveling, will be to reduce the thickness of the thick wall by a displacement of metal partly circumferentially of the tube and partly in a longitudinal direction.

It will be noted in FIG. 3 the body 22 is tilted with its longitudinal axis inclined with respect to the axis of the die 10. As shown, the effective edge of the mandrel body, i.e. the surface determinative of the tube wall thickness at the top of the tube is the trailing edge of the mandrel; while at the bottom of the tube the determinative surface of the mandrel lies near the midpoint thereof. Along the intermediate side wall portions of the tube, the effective surface of the mandrel body 22 determinate of the tube wall thickness will be located between the upper edge and lower surface points of separation between the body and the tube. Since the summation of forces must be equal on opposite sides of the mandrel for the mandrel position to become stabilized, the swivel mandrel will position itself so as to correct the eccentricity of the tube regardless of the amount or the angular location of tube eccentricity, and within the tilting limits of the structure, depending on the construction of mandrel used.

The distribution of forces tending to tilt the mandrel 21 to the position shown in FIG. 3 is diagrammatically illustrated in FIG. 6. As shown, the mandrel body is in an untilted and unbalanced position, with the summation D of forces acting downwardly on the mandrel being equal to the summation U of forces acting upwardly thereon. The heavy wall portion of the tube 40 will contact the mandrel body 22 on its upstream end prior to contact between the thin wall portion and the body 22, the resultant summation D of downward forces will, therefore, be to the left of the resultant summation U of upward forces. The resulting counterclockwise torque will tilt the mandrel body 22 to a stable position as shown in FIG. 3. The tilting or swivel movement will become stabilized when the resultant forces become equal and coaxial in, for example, the mandrel position of FIG. 3.

As shown in FIG. 5, the tube 40 leaving the die and swivel mandrel reducing stage will be substantially concentric, i.e., the center of radius of the inner and outer tube surfaces will be substantially identical. While the swivel mandrel has been illustrated as having its pivot point positioned within the die 10, it has been found that a high degree of tube eccentricity correction can be attained with a swivel mandrel by positioning the pivot point either upstream or downstream of the die location.

As an example of the operation of the fixed die and swivel mandrel disclosed, an eccentric tube with an outer diameter of 3.5 inches and an average wall thickness of .200 inch was cold drawn to an outer diameter of 3.0 inches and an average wall thickness of .140 inch. The reduction in the tube eccentricity was as high as 66%, and by increasing the thickness of the minimum wall, tubes which would otherwise be scrap were converted to a salable product.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. A method of decreasing the wall thickness of a metal tube of circular cross-section through a selected arc of the tube circumference, comprising the steps of drawing said tube through a die having a die orifice smaller than the diameter of the entering tube portion to reduce the outside diameter of the tube by effecting flow of the tube metal substantially longitudinally of the tube; and mechanically subjecting the interior of the tube portion as it passes through said die orifice to an outward unit pressure on an arc centered relative to the zone of maximum wall thickness different from the radial unit pressure exerted on the remaining portion of the tube circumference to effect a flow of tube metal longitudinally and circumferentially of the tube to thereby decrease the maximum tube wall thickness within the selected arc.

2. Apparatus for decreasing the eccentricity of a metal tube having maximum and minimum wall thickness comprising an annular reducing die, means for mounting said die in fixed upright position with the axis of said die parallel to the longitudinal axis of the tube to be passed through said die, means for drawing the tube through said reducing die, means for maintaining a mandrel within said tube and said die during drawing of the tube, and means for mounting said mandrel within said die for swivel movement about a fixed point relative to said tube and die to decrease the maximum wall thickness of and to thereby reduce the eccentricity of the tube.

3. Apparatus for decreasing the maximum wall thickness of a metal tube having maximum and minimum wall thickness substantially on opposite sides of the metal tube comprising an annular reducing die having a flared entry and a cylindrical throat, means for mounting said die in an upright position with the axis of said throat parallel to the longitudinal axis of a tube to be passed through said die, means for drawing a tube through said reducing die, a mandrel, means for positioning said mandrel within said tube at the location of said die throat during drawing of the tube through said die, and means for mounting said mandrel within said die for universal movement about a pivot point relative to said tube and die to decrease the maximum wall thickness of the drawn tube and to thereby reduce the eccentricity of the tube.

4. Apparatus for decreasing the maximum wall thickness of a metal tube having maximum and minimum wall thicknesses positioned substantially on opposite sides of the metal tube comprising an annular reducing die having a flared entry throat, means for mounting said die in an upright position with the axis of said throat parallel to the longitudinal axis of a tube to be passed through said die, means for drawing a tube through said reducing die, a mandrel, bar means for positioning said mandrel within said tube and die throat during drawing of the tube through said die, and means for mounting said mandrel within said die for universal movement about a pivot point substantially on the axis of said die to decrease at least the maximum wall thickness of the drawn tube and to thereby reduce the eccentricity of the tube.

5. Apparatus for reducing the eccentricity of a metal tube having maximum and minimum wall thickness substantially on opposite sides of the metal tube comprising an annular reducing die having a flared entry throat, means for maintaining said mandrel within said tube and the axis of said throat parallel to the longitudinal axis of a tube to be passed through said die, means for drawing a tube through said reducing die, a mandrel including a cylindrical body having an exterior diameter equal to the desired interior diameter of said drawn tube, bar means for mantaining said mandrel within said tube and said die during drawing of the tube, and means for attaching said mandrel on said bar means for universal movement of said cylindrical body about a fixed point coaxial with said die to decrease at least the maximum wall thickness of the drawn tube and to thereby reduce the eccentricity of the tube.

6. A method of decreasing the wall thickness of a metal tube of circular cross-section through a selected arc of the tube circumference, comprising the steps of drawing said tube through a die having a die orifice smaller than the diameter of the entering tube portion to reduce the outside diameter of the tube by effecting flow of the tube metal substantially longitudinally of the tube; and mechanically subjecting the interior of the tube portion as it passes through said die orifice to differential outward unit pressures on an arc centered relative to the zone of maximum wall thickness different from the radial unit pressures exerted on the remaining portion of the tube circumference to effect a flow of tube metal longitudinally and circumferentially of the tube to thereby decrease the maximum tube wall thickness within the selected arc.

References Cited in the file of this patent
UNITED STATES PATENTS

| | | |
|---|---|---|
| 1,007,834 | Wilson | Nov. 7, 1911 |
| 2,212,690 | Kelso | Aug. 27, 1940 |
| 2,351,710 | Sanders | June 20, 1944 |
| 2,392,821 | Kreag | Jan. 15, 1946 |
| 2,444,907 | Attridge | July 13, 1948 |
| 2,663,410 | Kessler | Dec. 22, 1953 |
| 2,693,274 | Kerr | Nov. 2, 1954 |
| 3,006,460 | Poncar | Oct. 31, 1961 |
| 3,013,652 | Russel | Dec. 19, 1961 |